(12) United States Patent
Dommnik et al.

(10) Patent No.: US 11,692,611 B2
(45) Date of Patent: Jul. 4, 2023

(54) CHAIN LINK FOR AN ENERGY GUIDING CHAIN AND AN ENERGY GUIDING CHAIN

(71) Applicant: igus GmbH, Cologne (DE)

(72) Inventors: Joerg Dommnik, Neunkirchen-Seelscheid (DE); Stefan Strack, Koenigswinter (DE); Thilo-Alexander Jaeker, Sankt Augustin (DE); Andreas Hermey, Hennef (DE)

(73) Assignee: IGUS GMBH, Cologne (DE)

( * ) Notice: Subject to any disclaimer, the term of this patent is extended or adjusted under 35 U.S.C. 154(b) by 1200 days.

(21) Appl. No.: 16/095,662

(22) PCT Filed: Apr. 21, 2017

(86) PCT No.: PCT/EP2017/059530
§ 371 (c)(1),
(2) Date: Oct. 22, 2018

(87) PCT Pub. No.: WO2017/182635
PCT Pub. Date: Oct. 26, 2017

(65) Prior Publication Data
US 2020/0355242 A1    Nov. 12, 2020

(30) Foreign Application Priority Data
Apr. 22, 2016    (DE) .................... 20 2016 102 154.5

(51) Int. Cl.
*F16G 13/16* (2006.01)
*H02G 11/00* (2006.01)

(52) U.S. Cl.
CPC ........... *F16G 13/16* (2013.01); *H02G 11/006* (2013.01)

(58) Field of Classification Search
CPC .......... F16G 13/16; F16G 13/12; F16G 13/14; F16G 13/00; H02G 11/006
(Continued)

(56) References Cited

U.S. PATENT DOCUMENTS 6,067,788 A * 5/2000 Weber .................. H02G 11/006
59/900
6,925,795 B2    8/2005 Komiya
(Continued)

FOREIGN PATENT DOCUMENTS

CN    1504655    6/2004
DE    4313075    11/1994
(Continued)

OTHER PUBLICATIONS

English translation of International Search Report from corresponding PCT Appln. No. PCT/EP2017/059530, dated Jul. 27, 2017.
(Continued)

*Primary Examiner* — Nkeisha Smith
(74) *Attorney, Agent, or Firm* — Grossman, Tucker, Perreault & Pfleger, PLLC

(57) ABSTRACT

A chain link for an energy guide chain. The chain link has two link plates, and at least one pivotal transverse web, which connects the link plates together in an articulated manner and which can be converted into a closed position that connects the link plates together and into an open position that at least partly releases the link plate intermediate space. At least one pivotally designed end region of the transverse web can be secured to the link plate in a latching manner. The articulated connection between the transverse web and the link plate has a substantially cylindrical joint pin with a radius (R1) over at least one part of the circumference of the pin on one of the corresponding components consisting of the transverse web and the chain link and a
(Continued)

substantially cylindrical pin receiving area on the other of the two corresponding components.

21 Claims, 7 Drawing Sheets

(58) Field of Classification Search
USPC .......................................................... 59/78.1
See application file for complete search history.

(56) References Cited

U.S. PATENT DOCUMENTS

| | | | | |
|---|---|---|---|---|
| 7,243,486 | B1* | 7/2007 | Ikeda | H02G 11/006 248/51 |
| 7,290,384 | B2* | 11/2007 | Weber | F16G 13/16 248/51 |
| 7,520,122 | B2* | 4/2009 | Kitagawa | H02G 3/0475 59/900 |
| 8,220,243 | B2* | 7/2012 | Komiya | H02G 11/00 59/900 |
| 8,505,272 | B1* | 8/2013 | Komiya | H02G 11/006 59/900 |
| 8,720,178 | B2* | 5/2014 | Wendig | H02G 11/006 248/51 |
| 8,806,847 | B2* | 8/2014 | Blase | F16G 13/16 59/900 |
| 8,807,490 | B2* | 8/2014 | Komiya | H02G 3/0468 248/51 |
| 9,328,795 | B2 | 5/2016 | Blase et al. | |
| 9,476,480 | B2* | 10/2016 | Hermey | H02G 3/0475 |
| 9,494,215 | B2* | 11/2016 | Hermey | F16G 13/16 |
| 9,695,910 | B2* | 7/2017 | Komiya | F16G 13/18 |
| 9,841,079 | B2* | 12/2017 | Komiya | H02G 11/006 |
| 9,897,163 | B2* | 2/2018 | Jaeker | F16G 13/16 |
| 2013/0032677 | A1 | 2/2013 | Komiya | |
| 2013/0212998 | A1* | 8/2013 | Komiya | H02G 11/006 59/78.1 |
| 2017/0108082 | A1 | 4/2017 | Barten | |
| 2021/0285517 | A1* | 9/2021 | Tetsuka | H02G 11/00 |

FOREIGN PATENT DOCUMENTS

| | | |
|---|---|---|
| DE | 19645403 | 5/1998 |
| DE | 202011004785 | 8/2011 |
| DE | 102012106784 | 2/2013 |
| DE | 202014101366 | 6/2014 |
| JP | 6-65652 | 9/1994 |
| JP | 2590484 | 3/1997 |
| JP | 9-512082 | 12/1997 |
| JP | 2011-247329 | 12/2011 |
| JP | 2013-036477 | 2/2013 |
| JP | 2013-170642 | 9/2013 |

OTHER PUBLICATIONS

English translation of International Preliminary Report on Patentability from corresponding PCT Appln. No. PCT/EP2017/059530, dated Apr. 4, 2018.

Office Action from related Japanese Appln. No. 2018-554008, dated Nov. 26, 2019. English translation attached.

Office Action from related Chinese Appln. No. 201780015989.5, dated Feb. 3, 2020. English translation attached.

Office Action from related Indian Appln. No. 201837027736, dated Apr. 24, 2020. English translation attached.

Office Action from related Japanese Appln. No. 2018-554008, dated May 12, 2020. English translation attached.

Office Action from related Korean Appln. No. 10-2018-7024657, dated Feb. 24, 2020.

* cited by examiner

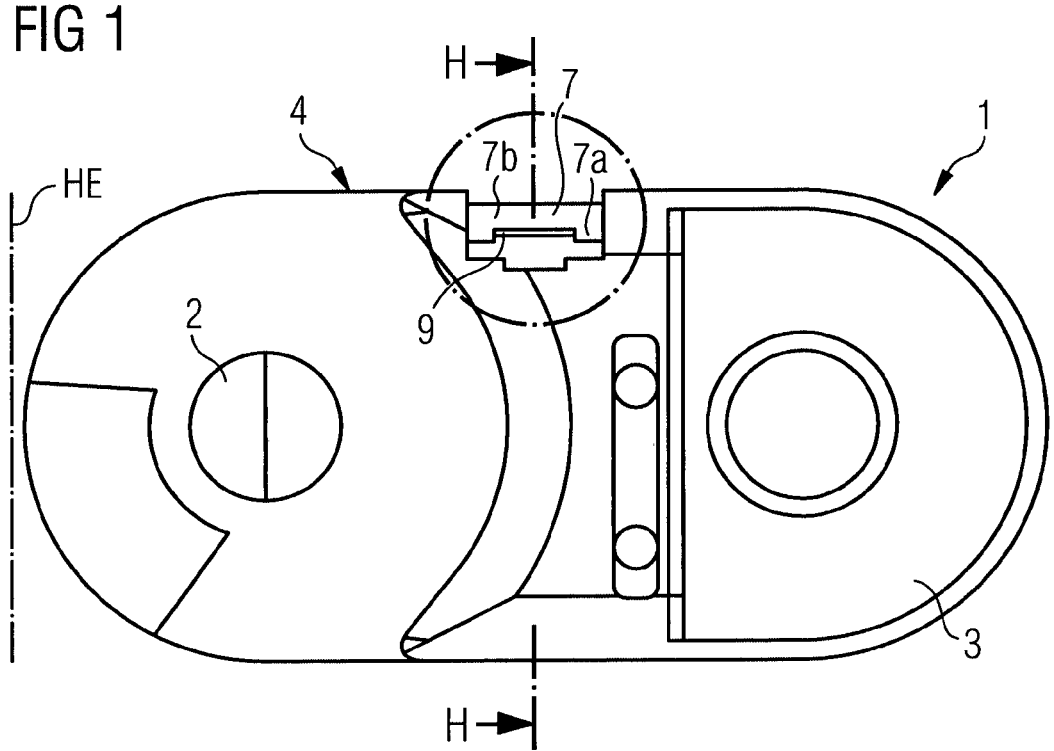

CHAIN LINK FOR AN ENERGY GUIDING CHAIN AND AN ENERGY GUIDING CHAIN

FIELD

The invention concerns a chain link for an energy guiding chain and an energy guiding chain having such chain links, wherein the chain link has at least one and preferably two mutually opposite transverse bars connecting the chain plates together.

BACKGROUND

Chain links of the general kind set forth are known for example from DE 4313075 A1. The pivotal connection of the at least one transverse bar to the chain link plates provides that the chain link can be easily handled when introducing cables, lines and the like into the interior of the chain link (or into the interior of the energy guiding chain), more specifically by pivoting the transverse bar into its open position without the transverse bar having to be completely removed from the chain link so that it would involve being an individual part. That is advantageous in particular in the case of chain links of only small structural size as then the comparatively small transverse bars can only be handled with relative difficulty and fixing them again to the chain plates is to be effected in a very careful fashion and thus is time-consuming.

Particularly in chain links of only small structural size however the problem occasionally arises that, in operation of the corresponding energy guiding chain, the cables, lines and the like which are guided in the chain links press against the inside of the transverse bar and can curve the transverse bar outwardly. That occurs in particular when the energy guiding chain is being displaced in the direction-changing region thereof, wherein, in the arrangement of the energy guiding chain, the direction-changing region connects together a top run and a bottom run of the chain, or possibly also in other regions of the energy guiding chain, the radius of curvature of which changes upon displacement of the chain. The outward curvature of the transverse bars by virtue of their being acted upon with the force applied by the guided cables, lines and so forth however entails on the one hand the risk that, at least at one of the end regions of the transverse bars, the hinge connection between the transverse bar and the chain plate is detached so that operation of the energy guiding chain then has be halted. In addition, the curvature of the transverse bar means that the chain link overall can suffer deformation in its cross-sectional geometry, which can lead to less smooth movement of the energy guiding chain and increased wear in the hinge regions between the adjacent chain links. Those problems arise in particular in the case of chain links of only small structural size which thus can also only involve a comparatively small thickness of material in respect of the chain link plates and the transverse bars.

DE 20 2011 004 785 U1 describes an energy guiding chain having chain links whose transverse bars are connected to the chain plates pivotably by means of a pivot horn and latchingly engage hinge pins, in the form of holding spindles, of the chain plates. The holding spindles of the plates are provided in cross-section over a certain arcuate portion with a recess or step which faces towards the plate center. The axial edges of the recess have latching projections of the pivot horn engaging behind them.

U.S. 2013/0212998 A1 describes chain links of the general kind set forth of an energy guiding chain, wherein the hinge connection between the transverse bar and the chain plate has a substantially cylindrical hinge pin of a radius R1 over at least a part of the periphery of the pin at one of the corresponding component parts of the transverse bar and the chain plate and a substantially cylindrical pin receiving means at the other of the two corresponding component parts. Over a portion of its length at the pin side that is away from the narrow sides the hinge pin has at least one recess which is set back from the cylindrical surface of the pin. The pin receiving means has at least one latching nose which projects from the cylindrical region of the pin receiving means of the radius R1 and engages into the recess (9).

SUMMARY

Therefore, the object of the invention is to provide a chain link for energy guiding chains, which permits more reliable operation of the energy guiding chain in particular in the case of chain links of only small structural size, wherein handling of the transverse bar when opening and/or closing the chain link and/or when introducing cables, lines or the like into the interior of the chain links can be easily implemented.

According to the invention the hinge pin has at least one recess which is set back from the cylindrical surface of the pin, over only a portion of its length at the pin side remote from the narrow sides, and into which the latching nose of the pin receiving means which projects from the cylindrical region of the pin receiving means with a radius R1 engages, in particular in the closed position of the transverse bar (or over the entire pivotal angle thereof). Moreover, in another portion cooperating with the pin receiving means the hinge pin is cylindrical and is therefore of a cross-section in the shape of a circular arc. In the closed position of the transverse bar therefore the latching nose preferably bears against a region which is set back from the cylindrical region of the hinge pin or engages behind same. This means that the latching connection between the pin receiving means and the hinge pin is additionally secured and unwanted detachment of the transverse bar in said hinge region in operation of the energy guiding chain is substantially impeded, thereby ensuring more reliable operation of the chain. Admittedly, in conventional chain links, the transverse bar per se is also fixed with a cylindrical pin receiving means on a cylindrical hinge pin, thereby forming a latching connection. In the configuration according to the invention of the chain link however the latching connection between the pin receiving means and the hinge pin is substantially stabilized with the peripheral extent of the pin receiving means around the hinge pin remaining the same. In that case the latching nose of the pin receiving means can bear against the hinge pin at the end region of the peripheral extent of the recess. In addition, the latching nose can be hooked at the end region of the recess, in particular in relation to the opening direction in the pivotal movement of the transverse bar. For that purpose, at least at the end region facing towards the latching nose (or at both end regions) the recess can have a convexly curved region or a region which extends flat in the radial direction of the hinge pin and against which the latching nose bears in the closed position of the transverse bar, or even an undercut configuration into which the latching nose engages. In that way, forces acting on the inside of the transverse bar, for example due to cables or lines pressing against the transverse bar, can be particularly favorably absorbed. In addition, in that way the width of opening of the pin receiving means for the hinge pin is only immaterially or practically not at all reduced in size so that latching engagement of the pin receiving means on to the hinge pin for fixing the transverse bar to the chain link plate is hampered only to an immaterial extent or practically not at all, which is of particular advantage especially in the case of small chain links involving small wall thicknesses. In addition, with the configuration according to the invention of the chain link, the cylindrical region of the hinge pin which also serves to guide the pin receiving means in the pivotal movement of the transverse bar is not enlarged radially outwardly, whereby pivotal movement of the transverse bar could be hindered or which otherwise could also lead to unwanted release of the transverse bar from the hinge pin if the transverse bar is pivoted beyond a certain extent in a direction towards its open position. In addition, it has been found that the chain link according to the invention has an increased service life and permits more uniform and smoother displacement of the energy guiding chain.

In the chain link according to the invention therefore there are two different latching regions for latching engagement of the hinge pin to the pin receiving means: on the one hand the latching region with the pin recess which is set back from the cylindrical surface of the pin with a radius R1 and into which the latching nose of the pin receiving means which projects from the cylindrical region of the pin receiving means with the radius R1 engages, and on the other hand the other (second) portion of the hinge pin which is cylindrical with a radius R1 and which cooperates with the pin receiving means of the radius R1. As that other (second) portion of the hinge pin therefore has a cross-section in the shape of a circular arc and/or a radius R1, this gives particularly precise and stable guidance for the transverse bar upon the pivotal movement thereof, as the pin receiving means of the radius R1 is guided over its entire peripheral extent about the pin of the radius R1 over the entire pivotal angle of the transverse bar. On the other hand, the additional latching connection by virtue of the latching nose which projects from the pin receiving means and which engages into the recess in the pin provides that the transverse bar is particularly well secured in its closed position, in particular in relation to being caused to curve outwardly by cables, lines or the like which are guided in the chain and which in operation of the energy guiding chain press against the transverse bar from the interior of the chain and can cause unintended release of the transverse bar. In the course of the invention however it has been found that, if just the transverse bar is held by the first-mentioned latching connection with the recess and by the latching nose projecting from the pin receiving means, that leads to an adverse effect on the pivotal properties of the transverse bar, in particular in the case of fast pivotal movement and/or in relation to forces acting on the transverse bar during the pivotal movement thereof or in an at least partially opened position, like for example when transverse forces and/or torsional forces are involved. In consideration of the invention that is attributed to the fact that precise holding and stabilization of the transverse bar on the pin is destabilized by the set-back recess into which only a latching nose of the pin receiving means engages, in particular in relation to transverse and/or torsional forces acting on the transverse bar, as the contact regions of the pin and the pin receiving means with each other of the radius R1 are reduced in size. It will be appreciated that, for example when the transverse bar is partially opened, the latching nose engaging into the recess opposes only a slight resistance to transverse and/or torsional forces, in comparison with the two operative regions of the pin and the pin receiving means of the radius R1. It is to be borne in mind in that respect that energy guiding chains are also often to be fitted with cables and the like under adverse conditions, for example in the case of manual fitting of a chain coupled to a machine for repair or maintenance of the chain, manual fitment of the chain in a piecework situation and so forth, wherein often uncontrolled forces can also act on the transverse bars upon opening or closing thereof. The two above-mentioned latching regions of the transverse bar therefore supplement each other in a particular fashion in order to provide an advantageous energy guiding chain, with the transverse bar also being easy to open and close. In addition, under some circumstances in operation of the chain with the transverse bar closed, transverse and/or torsional forces can act thereon, for example by virtue of cables and the like which are being guided in the chain hitting against the transverse bar.

By virtue of the cylindrical configuration of the pin region of the radius R1 and the same radius R1 in respect of the pin receiving means that portion of the pin and the pin receiving means cooperate in a play-free and clearance-free fashion. In the region of the second cylindrical portion of the pin therefore the pin and the pin receiving means bear against each other over their full surface area, more specifically over the entire pivotal angle of the transverse bar. In that way, upon pivotal movement of the transverse bar, having regard also to the first latching connection between the pin and the pin receiving means with the recess and the latching nose engaging into same, this arrangement provides for particularly stable guidance of the transverse bar by the hinge pin, in particular also in respect of transverse and/or torsional forces acting on the transverse bar in its partially or completely opened position or even in its closed position.

Preferably the other cylindrical portion of the pin latchingly cooperates with the pin receiving means, thereby providing for particularly stable and precise fixing of the transverse bar to the link plate both in the closed position and also in the pivotal movement of the transverse bar. For that purpose, the pin receiving means extends over more than 180° of the pin periphery, for example over >220° or >280° thereof. In a particularly preferred embodiment the recess and the latching nose engaging into same are arranged only in spaced relationship from the end regions of the hinge pin, the hinge pin being cylindrical at its two end regions. The set-back recess in the pin is therefore arranged in the central region of the area of cooperation as between the pin and the pin receiving means, preferably centrally in same. By virtue of the particularly exact guidance of the pin receiving means on the pin by virtue of the end regions, which are thus spaced from each other, of the radius R1, the transverse bar is particularly stabilized in relation to transverse and/or torsional forces, both in a partially or completely opened position of the transverse bar and also in its closed position, wherein that has proven to be particularly desirable also for exact guidance of the transverse bar in the pivotal movement thereof so that the transverse bar can be easily, exactly pivoted with a low level of wear. In addition, that provides that the central region of the transverse bar which is most frequently loaded by cable or the like pressing against the transverse bar from the interior of the chain is particularly stabilized. In addition, that design configuration can be produced in a particularly advantageous fashion by injection molding.

Alternatively, at least one recess and the latching nose engaging into same or a plurality of recesses and the respective latching noses engaging into same can be arranged not only spaced from the end regions of the hinge pin, with the hinge pin being provided in another portion or of a cylindrical configuration. Optionally in that case the hinge pin can also be cylindrical in a plurality of other portions. At least one recess or the latching nose engaging into same can be arranged at at least one or at both end regions of the hinge pin, wherein the hinge pin is of a cylindrical configuration (that is to say of the radius R1 over its entire periphery) at a portion which is different from one or both end regions of the pin. Preferably the recess and the latching nose engaging into same are provided at both end regions of the hinge pin. Preferably the cylindrical portion of the pin of the radius R1 which therefore extends around the pin over the entire periphery is arranged in the central region of the pin, particularly preferably centrally on the pin. That can be particularly advantageous for example if the width of the transverse bar is comparatively small relative to the length of the chain link, and thus the lateral edge regions of the transverse bar are more heavily loaded by cables or the like pressing against same from the interior of the chain.

Optionally, there can also be two or more set-back recesses in the pin with latching noses engaging into same on the pin receiving means and/or more than two other (second) portions of the pin of a cylindrical shape at a holding region of the transverse bar, which for example can also be arranged in alternate mutually juxtaposed relationship. Optionally, at a holding region of a transverse bar, the arrangement can also have only one pin recess with a latching nose of the pin receiving means engaging into same, and only one other (second) portion of the pin with a radius R1 over its entire periphery. In general, therefore the first and/or the second of the two specified different regions of the hinge pin and the pin receiving means can provide a plurality of mutually spaced portions.

The region of the pin with the recess and the second cylindrical pin region can respectively extend independently of each other over 10-90% or 20-80% or 35-65%, for example 40-60%, over the widthwise extent of the pin receiving means.

Preferably the recess and the hinge pin are of a mirror-image symmetrical configuration with respect to the longitudinal axis of the transverse bar over the portion of the respective longitudinal extent in which the pin and the pin receiving means cooperate. That provides a particularly advantageous distribution of forces when cables or the like press against the inside of the transverse bar, in particular as the location at which the transverse bar is subjected to such forces can vary unpredictably in operation of the chain and this can provide for simple and reliable handling of the transverse bar in various chain fitment situations.

In combination with the foregoing configuration, it is possible to provide a chain link in which, in addition to the hinge connection between the hinge pin and the pin receiving means of the radius R1, there are provided latching means which latchingly cooperate between the transverse bar in its closed position and the chain link plate and said additional latching means limit the pivotal angle of the transverse bar in the open position thereof. That additional latching means impedes unintentional opening of the transverse bar; in addition handling of the chain link when fitting same with cables, lines and so forth or when removing cables, line and so forth, is made substantially easier by virtue of the latching means being in the form of an abutment in the open position of the transverse bar. The latching means can include the above-mentioned latching nose of the pin receiving means. The cooperating configuration (counter-latching means) of the latching nose can be provided by the one portion of the hinge pin, for example an end region of the above-mentioned recess. In general, the abutment can be arranged at the inwardly disposed side of the pin receiving means.

Preferably the recess is of an arcuate surface contour, with the same direction of curvature as the cylindrical surface of the pin. That is of particular advantage when the latching nose of the pin receiving means, in the pivotal movement of the transverse bar, contacts the hinge pin in the region of the recess or bears against same, at least over a part of the pivotal movement of the transverse bar.

In general, in accordance with the invention, the latching nose can bear against the hinge pin at least over a portion of the pivotal angle of the transverse bar, preferably in the region of the recess in the hinge pin, for example in the end regions of the recess, with respect to the peripheral extent of the recess around the hinge pin. Preferably the latching nose bears against the hinge pin, in particular in the region of the recess thereof, over the entire pivotal angle of the transverse bar.

Particularly preferably the surface contour of the recess is in the form of a circular arc of a radius R2 so that, when the latching nose bears against the cylindrical surface contour of the hinge pin, in the region of the recess, simple pivotal movement of the transverse bar is made possible without in that case involving deformation of the latching nose or a region of the pin receiving means. The radius R2 here is smaller than the radius R1 of the cylindrical region of the hinge pin.

The recess can generally be in the form of a groove, preferably of a constant groove depth over the extent of the recess in the peripheral direction of the hinge pin.

The recess is generally disposed in accordance with the invention preferably beneath an axis, defined by the radius R1, of the hinge pin (axis of the cylinder) wherein the hinge axis is disposed in said plane and said plane extends parallel to the longitudinal extent of the transverse bars and perpendicularly to the main plane of the chain plates. In that case the main plane of the chain plates extends parallel to the outside and inside surfaces of the chain plates.

The hinge pin is respectively preferably arranged at the hinge plate and the pin receiving means at the transverse bar.

The recess can extend symmetrically relative to a central plane of the hinge pin which contains the axis of the cylinder of the hinge pin, wherein the pin central plane can be arranged parallel to the main central plane of the chain plates.

Particularly preferably the axes of curvature of the recess and the cylindrical surface (therefore the cylindrical outside surface) of the radius R1 of the pin are arranged in mutually coaxial relationship. The cylindrical defining surface of the pin receiving means and the defining edges of the latching nose are thus displaced on concentric radii upon pivotal movement of the transverse bar about its pivot axis. The cylinder axis of the hinge pin can thus generally represent the axis of pivotal movement of the transverse bar in accordance with the invention. That permits simple pivotal movement of the transverse bar without that being impaired by the latching nose engaging into the recess or in particular also a latching nose bearing against the hinge pin in the region of the recess.

Preferably the latching nose which engages into the recess is disposed at the side of the pin receiving means, that faces towards the outside of the chain plate. That particularly effectively impedes or prevents release of the transverse bar when it is subjected to forces at its inside by cables, lines or the like. When a force is applied to the inside of the transverse bar, which could cause outward curvature thereof, the latching nose is urged in the direction of the axis of the hinge pin by virtue of the specified geometry and thus the latching connection between the latching nose and the hinge pin is additionally secured or locked. In addition, that does not impede the pivotal movement of the transverse bar upon opening thereof as then the latching nose which is preferably arranged beneath the axis of the hinge pin is pivoted in the direction towards the inside of the respective chain plate and is arranged within the recess.

In the region of the pin receiving means and/or at its end regions or possibly also over its entire extent the transverse bar can be of a configuration which is free from openings at its outside (the side facing away from the chain link). That prevents for example dirt deposits (for example due to abrasive wear) in the region of an aperture so that the energy guiding chain can be advantageously used in a dirty environment or under clean-room conditions.

It will be appreciated that generally the recess preferably extends at least over the same angular extent as the pivotal angle of the transverse bar upon movement thereof from its closed position into its open position, in which respect the recess can also be of a greater angular extent. In that respect the angular extent relates to the peripheral direction of the hinge pin.

Particularly preferably the recess and the latching nose engaging into same are only arranged at a spacing from the end regions of the hinge pin, wherein the hinge pin is of a cylindrical configuration of a radius R1 at its two end regions. That provides for stable guidance of the transverse bar in the pivotal movement thereof by virtue of the spaced cylindrical regions of the hinge pin. The cylinder portions of the hinge pin at the end regions thereof can be arranged directly at the end regions of the hinge pin and can thus be in contact with the end regions of the pin receiving means extending in the longitudinal direction of the pin, in the pivotal movement of the transverse bar. Optionally the cylinder regions of the hinge pin of the radius R1 can also be spaced from the end regions of the pin receiving means, preferably only slightly. Preferably at the same time the latching nose of the pin receiving means is in contact with the hinge pin in the region of the recess upon pivotal movement of the transverse bar, whereby the stability of the hinge connection between the transverse bar and the chain plate is additionally enhanced. Particularly preferably there is provided an abutment for limiting the pivotal angle of the transverse bar in its open position. That facilitates handling of the chain link when introducing cables, lines or the like into the interior of the chain link or when removing said cables, lines or the like from the interior of the chain link. Particularly preferably an end region of the recess is in the form of an abutment which comes into contact with a corresponding abutment of the transverse bar which in particular can be provided by the latching nose of the pin receiving means, thereby providing an advantageous development of the design configuration of the chain link. The abutment at the end region of the recess can be provided for example by a projection or a suitable configuration of the end region of the recess, for example by the recess going into the pin receiving means with a step or by the surface defining the receiving means extending substantially in a radial direction or optionally by an undercut configuration being provided at the end region of the recess. In the abutment position of the transverse bar (open position) the transverse bar can be arranged substantially in a position of prolongation with the chain plate so that the pivotal angle of the transverse bar is about 90°, preferably the pivotal angle of the transverse bar being greater than 90°, for example >100° or >120°, optionally also >180° so that the transverse bar is supported in a stable condition in its open position without additional means. The latching nose of the pin receiving means can thus perform a multiple function on the one hand in relation to preventing outward curvature of the transverse bar, and on the other hand acting as an abutment in the open position of the transverse bar.

Preferably the region of the pin receiving means of the transverse bar, that faces towards the inside of the chain plate, projects further from the transverse bar in the direction of the interior of the chain link, than the region of the pin receiving means, that is towards the outside of the chain plate. The further projecting region of the pin receiving means can serve in this case as a kind of guide means or insertion aid when latching the transverse bar on to the hinge pin. In addition, that can provide an at least substantially continuous inside of the chain link, even in the transitional region between the transverse bar and the inside of the chain plate. That prevents damage, for example also due to abrasive wear, of cables, lines or the like guided in the interior of the chain link, in operation of the energy guiding chain. Particularly preferably for that purpose the region of the pin receiving means, that is towards the inside of the chain plate, terminates with the inside of the chain plate in the closed position of the transverse bar so that the inside of the chain link is continuous and preferably does not have any gap in the transitional region between the transverse bar and the chain plate, when the transverse bar is closed.

Preferably there are no projections protruding into the interior of the chain link in the transitional region between the transverse bar and the chain plate on the side thereof that is towards the interior of the chain link. That facilitates introducing cables and so forth into the interior of the chain link and in addition avoids damage to cables, lines and the like in operation of the energy guiding chain, for example also due to abrasive wear. That is also substantially achieved by the configuration according to the invention of the hinge connection between the transverse bar and the chain plate, in particular also by the abutment arranged on the hinge pin and the described configuration of a transverse bar abutment in the region of the hinge pin recess.

Preferably a slot for introducing a tool such as a screwdriver is provided in the closed position of the transverse bar between the chain plate and the region of the pin receiving means, that is towards the outside of the chain plate, so that the transverse bar can be levered off the hinge pin in order to open the chain link by introducing the tool into the slot.

Particularly preferably hinge connections between the transverse bar and the chain plate are provided at both opposite end regions of the respective transverse bar and are of a design configuration in accordance with the invention. In that way the transverse bar can be released at both end regions from the respective hinge pin or the chain link can be opened at both end regions of the transverse bar. In that way the chain link can be handled flexibly when introducing or removing cables, lines or the like. In addition, that effectively counteracts outward curvature of the transverse bar and unintentional release of the transverse bar from the chain plates in operation of the energy guiding chain.

In accordance with a preferred variant only one of the two mutually opposite transverse bars of the chain link is held hingedly releasably at at least one or both end regions thereof at a chain plate, in a configuration which is in accordance with the invention, and the opposite transverse bar is formed in one piece on the two chain plates. The stability of the chain link is enhanced thereby, in particular in the case of chain links of small size. In another variant both transverse bars which are disposed in opposite relationship on a chain link can be adapted to be releasable from the plates, in particular in accordance with the invention, so that the chain link is to be opened from both sides.

The invention further concerns an energy guiding chain having a plurality of chain links which are hingedly connected together and which are each designed according to the invention. The energy guiding chain can be of such a configuration that it can be arranged with an upper run, a lower run and a direction-changing region disposed between them. The upper and lower runs in that case can be arranged in a straight condition, in which case adjacent chain links can be in abutment with each other. In the direction-changing region the chain links are pivoted relative to each other and are therefore not in the abutment position with respect to each other.

BRIEF DESCRIPTION OF THE DRAWINGS

The invention is described by way of example with reference to the Figures in which:

FIG. 1 shows a side view of a chain link according to the invention without transverse bar;

DETAILED DESCRIPTION

Figure 2A:
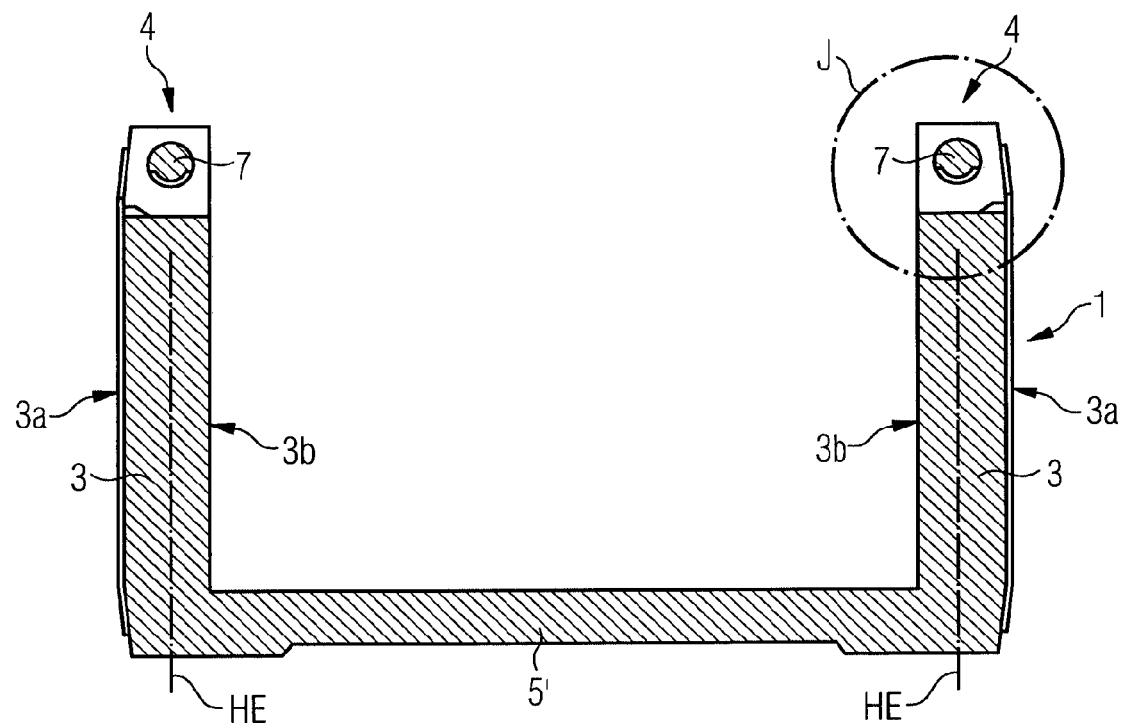
FIG. 2a shows a cross-sectional view of the chain link of FIG. 1 taken along section line H-H of FIG. 1.
Figure 2B:
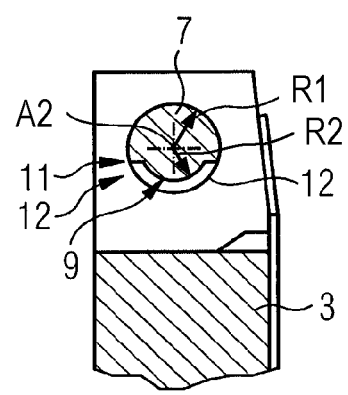
FIG. 2b shows an enlarged detail view of FIG. 2a as bounded by circle J.
Figure 3A:
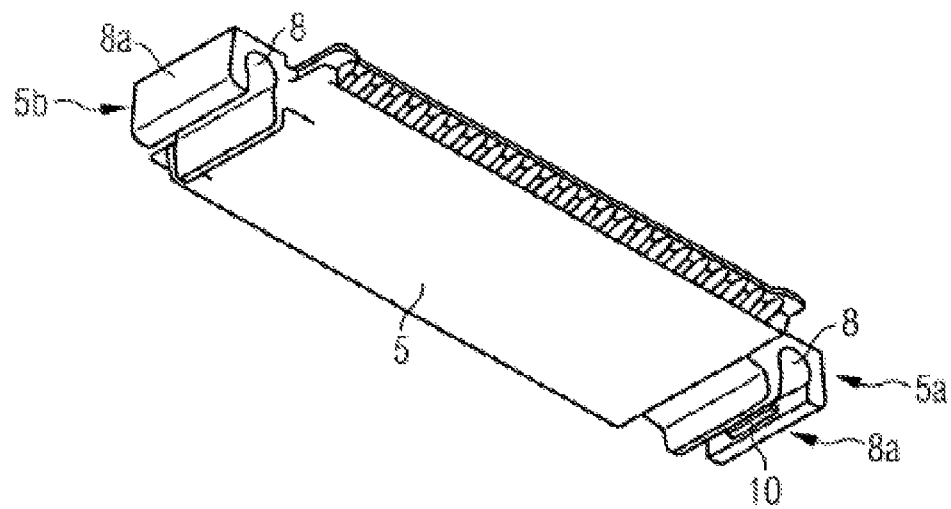
FIG. 3a shows a transverse bar of the chain link of FIG. 1 as a perspective view.
Figure 3B:
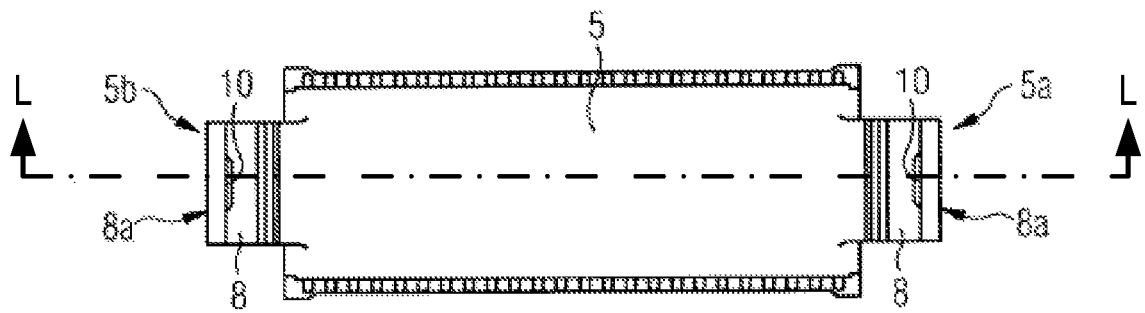
FIG. 3b shows a plan view of the transverse bar.
Figure 3C:
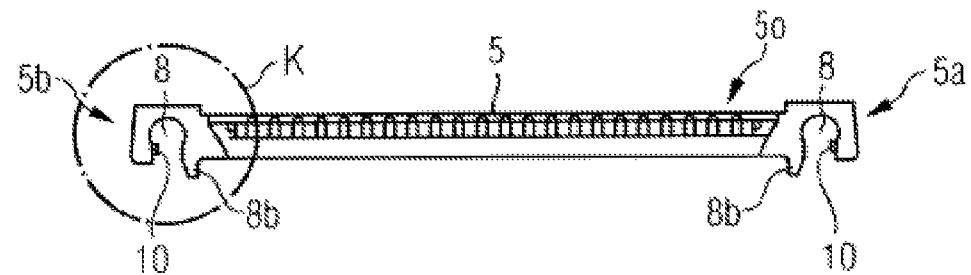
FIG. 3c shows a side view of the transverse bar.
Figure 3D:
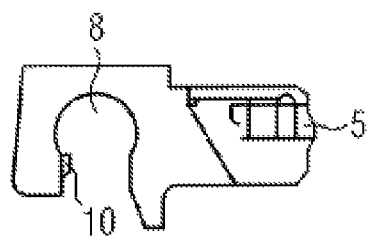
FIG. 3d shows an enlarged detail view of FIG. 3c as bounded by circle K.
Figure 3E:
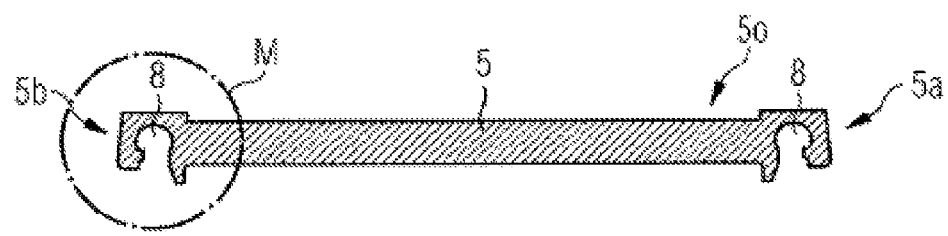
FIG. 3e shows a cross-sectional view of the transverse bar of FIG. 3b taken along section line L-L of FIG. 3b.
Figure 3F:
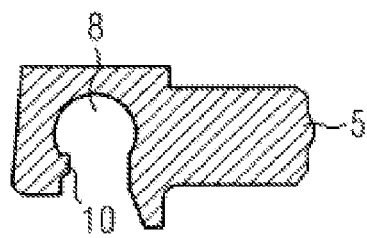
FIG. 3f shows an enlarged detail view of FIG. 3e as bounded by circle M.
Figure 4A:
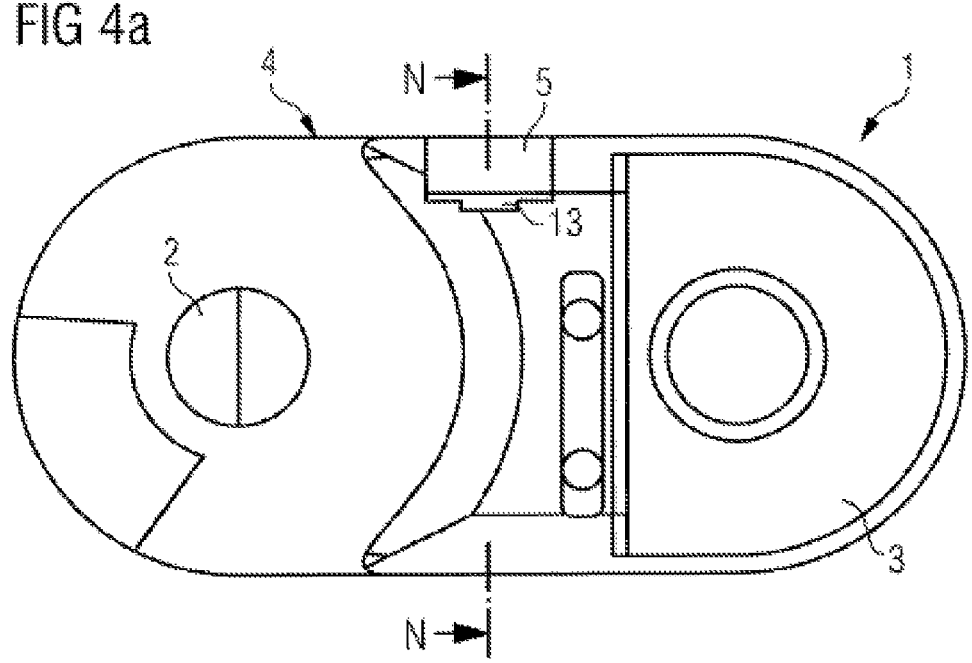
FIG. 4a shows a chain link of FIG. 1 with a transverse bar as a side view.
Figure 4B:
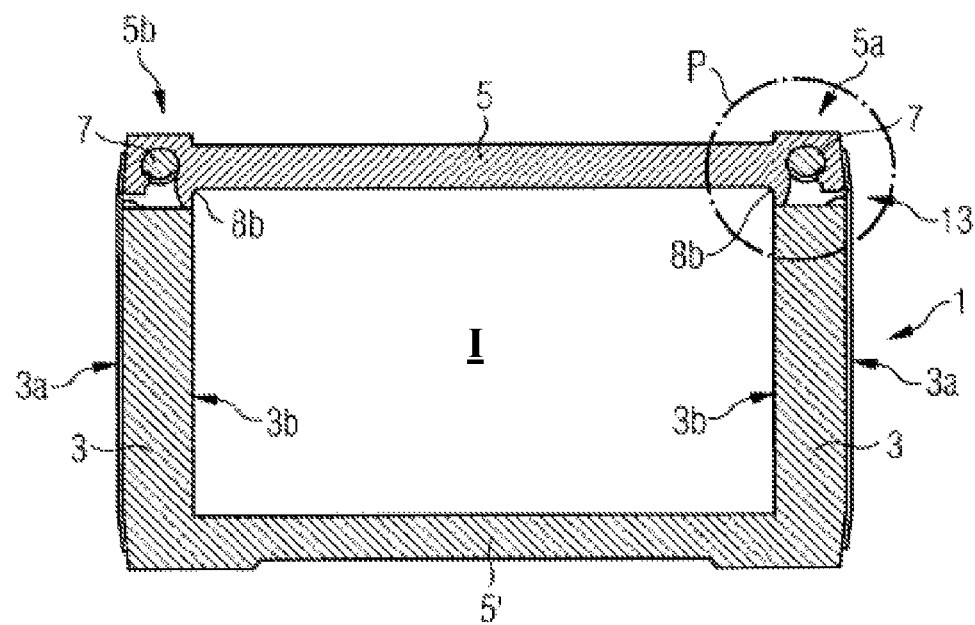
FIG. 4b shows a cross-sectional view of the chain link of FIG. 4a taken along section line N-N of FIG. 4a, with the transverse bar in a closed position.
Figure 4C:
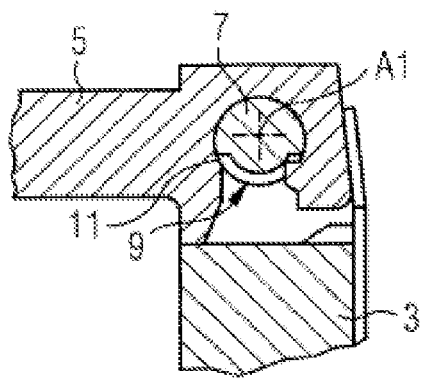
FIG. 4c shows an enlarged detail view of FIG. 4b as bounded by circle P, with the transverse bar in the closed position.
Figure 4D:
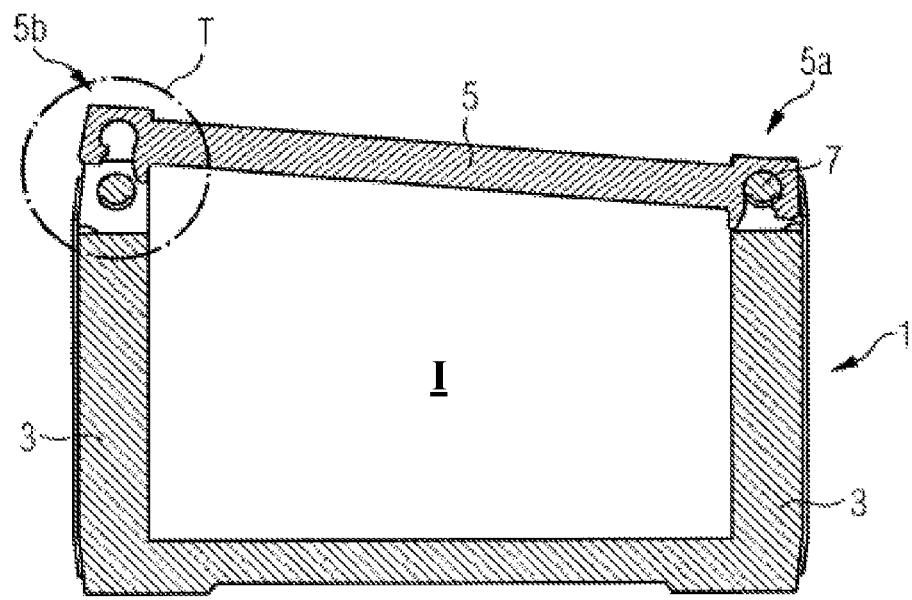
FIG. 4d shows a cross-sectional view of the chain link of FIG. 4a, with the transverse bar in a partially open position.
Figure 4E:
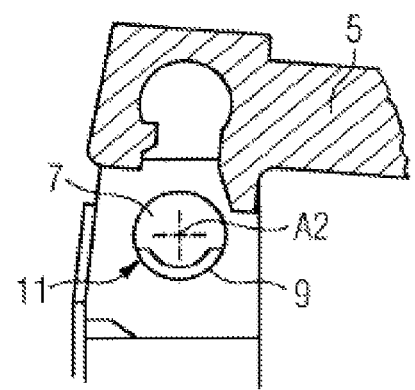
FIG. 4e shows an enlarged detail view of FIG. 4d as bounded by circle T, with the transverse bar in the partially open position.

FIGS. 1 through 4 show a chain link 1 according to a first embodiment or parts thereof for an energy guiding chain for guiding cables, lines and the like, wherein the chain link 1 has hinge elements 2 for hinged connection to further chain links of the same structure, for forming the energy guiding chain. The chain link 1 has two chain plates 3 which are laterally spaced from each other with narrow sides 4 which delimit same and which extend in the longitudinal direction of the chain link 1, and at least one, and here two, mutually oppositely disposed transverse bars 5 connecting the chain plates together. The chain plates 3 have a main plane HE which extends parallel to the longitudinal direction of the chain link 1 and thus also parallel to the longitudinal direction of the chain, and extends transversely or perpendicularly to the transverse bars 5. At least one transverse bar 5 (here precisely one) is adapted to be pivotable, forming a hinge connection, in relation to at least one chain plate 3, in accordance with this example the transverse bar 5 is adapted to be pivotable with respect to both chain plates 3 or is hingedly connected to both plates 3. The transverse bar 5 can be transferred with a pivotal movement into a closed position (FIGS. 4a and 4b) connecting the chain plates together and into an open position (FIGS. 4d and 4e) which at least partially opens the intermediate space between the chain plates 3. The hinge connection between the transverse bar 5 and the chain plate 3 is thus designed to be releasable, which can apply generally in accordance with the invention. At least one pivotable end region 5a, 5b of the transverse bar 5 (here both end regions 5a, 5b) can be fixed in latching engagement to the chain plate 3 which is hingedly connected to the transverse bar 5. The hinge connection between the transverse bar 5 and the chain plate 3 respectively includes a hinge pin 7 and a pin receiving means 8. The hinge pin 7 is substantially cylindrical with a radius R1 over at least a part of the periphery of the pin 7. The hinge pin 7 is here arranged on the chain plate 3 or is formed thereon. The substantially cylindrical corresponding pin receiving means 8 is here arranged at the end region 5a, 5b of the transverse bar 5.

The hinge pin 7 has at least one recess 9 at least over a portion of its length at the side of the pin 7 that faces away from the narrow sides 4 (the pin underside), the recess 9 being set back from the cylindrical surface of the radius R1 of the pin 7. The recess 9 is by way of example in the form of a groove with a groove depth which is constant over its extent. The pin receiving means 8 has at least one latching nose 10 which projects from the cylindrical region of the pin receiving means 8 of the radius R1 and engages into the recess 9. In addition, in another (second) portion which cooperates with the pin receiving means 8 of the radius R1 the hinge pin 7 is cylindrical of a radius R1, that is to say with a cross-section in the shape of a circular arc. That cylindrical portion here forms the two end regions 7a, 7b of the pin 7.

Furthermore, according to the invention in addition to the hinge connection between the hinge pin 7 and the pin receiving means 8 of the radius R1, there is provided a latching means which cooperates in latching engagement between the transverse bar 5 in its closed position and the chain plate 3, and limits the pivotal angle of the transverse bar 5 in the open position thereof. The latching means is here formed by the above-mentioned latching nose 10 of the pin receiving means 8. The counterpart to the latching means is here afforded by the hinge pin 7, more precisely by the end region of the recess 9 (or the hinge pin region forming the recess end region).

The other (second) cylindrical portion of the pin 7 latchingly cooperates with the pin receiving means 8. For that purpose, the pin receiving means 8 surrounds the second portion of the pin 7 over more than 180°, for example about 300°. As the other (second) cylindrical portion of the pin and the pin receiving means 8 over the entire cooperating width thereof are of the radius R1, other (second) cylindrical portions of the pin 7 and the pin receiving means 8 cooperate in gap-free relationship, that is to say they bear against each other over their full surface area.

The recess 9 is of an arcuate surface contour, with the same direction of curvature as that of the cylindrical surface of the pin 7, more specifically the surface contour of the recess 9 is in the shape of a circular arc of the radius R2, with R2 being less than R1. The axes of curvature A1 and A2 of the recess 9 and the cylindrical surface of the pin 7 are arranged in mutually coaxially relationship. The axis of curvature A2 of the pin 7 (axis of the cylinder) forms the pivot axis of the transverse bar 5. The recess 9 extends over more than 90° of the hinge pin periphery, for example up to about 120°.

The latching nose 10 which engages into the recess 9 is arranged at the side 8*a* of the pin receiving means 8, that is towards the outside 3*a* of the plate 3.

The latching nose 10 which engages into the recess 9 bears at least over a part of or here the entire pivotal movement of the transverse bar 5 against the hinge pin 7, more precisely against the curved defining surface of the recess 9.

In addition, there is an abutment 11 for limiting the pivotal angle of the transverse bar 5 in its open position, which is here afforded by the end region 12 of the recess 9.

The recess 9 and the latching nose 10 which engages into same are arranged spaced from the end regions 7*a*, 7*b* of the hinge pin 7, the hinge pin 7 being cylindrical of a radius R1 at its two end regions 7*a*, 7*b*.

In this arrangement the recess 9 and the hinge pin 7 are of a mirror image-symmetrical relationship with the longitudinal axis of the transverse bar 5 over the portion of the respective longitudinal extent in which the pin 7 and the pin receiving means 8 cooperate. The portion of the pin 7 with the inwardly set recess 9 and the cylindrical (second) portion of the pin 7 respectively extend over about 40-60% of the longitudinal extent of the pin 7.

The region 8*b* of the pin receiving means 8 of the transverse bar 5, that faces towards the inside 3*b* of the chain plate 3, projects further from the transverse bar 5 in the direction of the chain link interior I, than the region 8*a* of the pin receiving means 8, that faces towards the outside 3*a* of the chain plate 3. In the closed position of the transverse bar 5, the region 8*b* of the pin receiving means 8, that faces towards the inside 3*b* of the chain plate 3, terminates with the inside 3*b* of the chain plate 3. The top side 5*o* of the transverse bar 5 is closed in particular also in the region of the pin receiving means 8, or is of an opening-free structure.

In the closed position of the transverse bar 5, between the chain plate 3 and the region of the pin receiving means 8, that faces towards the outside 3*a* of the chain plate 3, there is a slot 13 for introducing a tool, by means of which the transverse bar 5 can be levered off the hinge pin 7, with release of the pin receiving means 8.

At both end regions 5*a*, 5*b* the transverse bar 5 has hinge connections according to the disclosure. The two hinge regions at the transverse bar ends are preferably of the same structural configuration. Only one of the two mutually opposite transverse bars 5 of the chain link 1 is hingedly held to the chain plate 3 at both end regions 5*a*, 5*b* (or possibly only one end region) thereof. The oppositely disposed transverse bar 5' is formed integrally on the chain plates 3.

As in the illustrated embodiment both chain plates 3 can be of mirror image relationship with each other (and otherwise of the same structure) generally in accordance with the disclosure.

By connecting the chain links 1 with the hinge elements 2 an energy guiding chain can be assembled comprising a plurality of chain links 1 which can be angled relative to each other. For example, the chain is or can be arranged with an upper run and a lower run and with a curved direction-changing region connecting the upper run and the lower run, as is generally known, without being restricted thereto.

Figure 5:
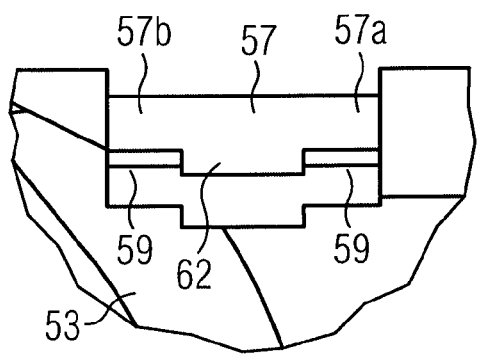
FIG. 5 shows a view of part of a chain link with a hinge pin of a further embodiment.
Figure 6:
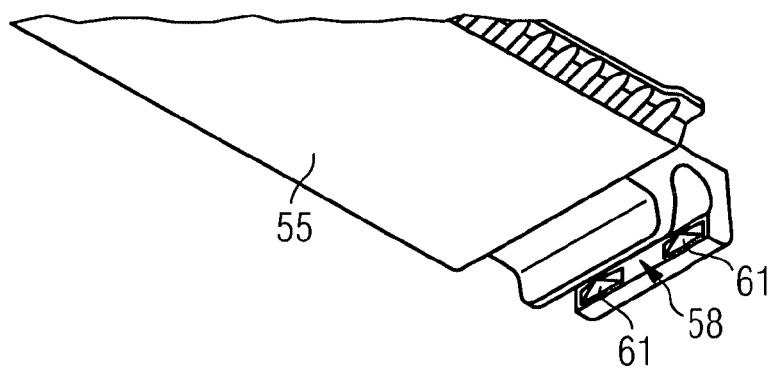
FIG. 6 shows a view of part of a transverse bar with a pin receiving means, corresponding to the hinge pin shown in FIG. 5.

FIGS. 5 and 6 show a chain plate 53 with a hinge pin 57 and a corresponding transverse bar 55 with pin receiving means 58 as a modification of the embodiment shown in FIGS. 1-4, in other respects attention is correspondingly directed for that purpose to the foregoing description relating to FIGS. 1-4, including in relation to the further configurations of the chain link and the energy guiding chain.

In accordance with this embodiment arranged at both end regions 57*a*, 57*b* of the hinge pin 57 is a respective recess 59 and a latching nose 61, engaging into same, of the pin receiving means 58. It will be appreciated that the latching noses 61 arranged at the end regions 57*a*, 57*b* of the pin 57 are arranged at the pin receiving means 58 at the level of the end region 57*a*, 57*b* of the pin 57. In this case the hinge pin 57 is cylindrical at a portion 62 which is different from the two end regions 57*a*, 57*b* of the pin 57, and therefore involves a cross-section in the shape of a circular arc, of a radius R1. The cylindrical portion 62 of the pin 58 is here therefore disposed in the central region of the pin 57. The features of these embodiments can respectively apply in accordance with the invention independently of each other or in combination with each other.

What is claimed is:

1. At least one chain link for an energy guiding chain to guide at least one of a cable or a line, the chain link comprising:

hinge elements configured to form a hinged connection with a further chain link of the energy guiding chain, two chain plates laterally spaced from each other, the chain plates each extending in a longitudinal direction of the chain link and each having a narrow side, at least one transverse bar connecting the chain plates together, wherein the at least one transverse bar forms at least one pivotable hinge connection with at least one chain plate of the chain plates, and the at least one transverse bar is positionable by pivotal movement into a closed position of connecting the chain plates together and into an open position at least partially opening an intermediate space between the chain plates, wherein the at least one transverse bar has at least one pivotable end region, the at least one pivotable end region latchingly fixable to the at least one chain plate of the at least one pivotable hinge connection, wherein the at least one pivotable hinge connection comprises a hinge pin and a hinge pin receiving means, wherein the hinge pin is provided by one of the at least one transverse bar and the at least one chain plate, and the hinge pin receiving means is provided by the other of the at least one transverse bar and the at least one chain plate, wherein the hinge pin has a length, the length having at least one first section of cylindrical configuration having a radius (R1) over an entire circumference of the hinge pin, and the hinge pin has at least one second section, the second section having at least one recess extending only over a portion of the circumference of the hinge pin, the at least one recess located at a side of the hinge pin that is remote from the narrow side of the at least one chain link, wherein the hinge pin receiving means has at least one latching nose which projects from a cylindrical region of the hinge pin receiving means, the cylindrical region of the hinge pin receiving means having the radius (R1), and the at least one latching nose engaging into the at least one recess of the hinge pin, wherein the latching nose only extends over a portion of the length of the hinge pin, and wherein the at least one recess of the hinge pin is provided only over a portion of the length of the hinge pin at the side of the hinge pin that is remote from the narrow side of the at least one chain link, and the cylindrical configuration of the hinge pin cooperates with the cylindrical region of the hinge pin receiving means.

2. The chain link as set forth in claim 1, wherein the cylindrical configuration of the hinge pin latchingly cooperates with the cylindrical region of the hinge pin receiving means.

3. The chain link as set forth in claim 1, wherein the cylindrical configuration of the hinge pin is provided at opposing end regions of the hinge pin, and the at least one recess and the at least one latching nose engaging into the at least one recess are arranged spaced from the opposing end regions of the hinge pin.

4. The chain link as set forth in claim 1, wherein the hinge pin has opposing end regions, and the at least one recess and the at least one latching nose engaging into the at least one recess are arranged at at least one or at both of the opposing end regions of the hinge pin, and the cylindrical configuration of the hinge pin is at a portion of the hinge pin which is different from one or both of the opposing end regions of the hinge pin.

5. The chain link as set forth in claim 1, wherein the at least one recess and the hinge pin are of a mirror image-symmetrical configuration relative to a longitudinal axis of the transverse bar over a portion of a respective longitudinal extent, in which the hinge pin and the hinge pin receiving means cooperate.

6. The chain link as set forth in claim 1, wherein the at least one recess of the hinge pin has an arcuate surface contour, with a same direction of curvature as that of a cylindrical surface of the cylindrical configuration of the hinge pin.

7. The chain link as set forth in claim 6, wherein the arcuate surface contour of the at least one recess is in a shape of a circular arc of a radius (R2), with radius (R2) being smaller than radius (R1).

8. The chain link as set forth in claim 6, wherein axes of curvature of the at least one recess and the cylindrical surface of the hinge pin are arranged in mutually coaxial relationship.

9. The chain link as set forth in claim 1, wherein the at least one latching nose engaging into the at least one recess is arranged at a side of the pin receiving means that faces towards an outside of the at least one chain plate.

10. The chain link as set forth in claim 1, wherein the at least one latching nose engaging into the at least one recess bears against the hinge pin at least over a portion or an entire pivotal movement of the transverse bar.

11. The chain link as set forth in claim 1, further comprising an abutment which delimits a pivotal angle of the transverse bar in the open position.

12. The chain link as set forth in claim 1, wherein the hinge pin receiving means is provided by the at least one transverse bar, the hinge pin receiving means comprising a region that faces towards an inside of the at least one chain plate, the region projecting from the transverse bar in a direction towards an interior of the chain link further than a region of the hinge pin receiving means that faces towards an outside of the at least one chain plate.

13. The chain link as set forth in claim 1, wherein a region of the hinge pin receiving means that is towards an inside of the chain link terminates with an inside of the at least one chain plate in the closed position of the at least one transverse bar.

14. The chain link as set forth in claim 1, wherein a slot for introducing a tool is provided in the closed position of the at least one transverse bar between the at least one chain plate and a region of the hinge pin receiving means, by which tool the at least one transverse bar is leverageable off the hinge pin to release the hinge pin receiving means.

15. The chain link as set forth in claim 1, wherein the at least one transverse bar has opposite end regions, and the at least one transverse bar forms at least one pivotable hinge connection with each chain plate of the chain plates, and each pivotable hinge connection comprising the recess in the hinge pin and the latching nose of the hinge pin receiving means that engages into the recess, respectively.

16. The chain link as set forth in claim 1, wherein the at least one transverse bar connecting the chain plates together comprises two opposite transverse bars connecting the chain plates together, and only one of the two opposite transverse bars is hingedly held releasably to the chain plate at at least one or both end regions of the chain link, and the opposite transverse bar is formed integrally on the chain plates.

17. The chain link as set forth in claim 1, wherein in addition to the pivotable hinge connection provided by the hinge pin and the hinge pin receiving means, there is provided a latching means which latchingly cooperate between the transverse bar in its closed position and the at least one chain plate and the latching means limits a pivotal angle of the transverse bar in the open position.

18. The chain link as set forth in claim 1, wherein the chain link is arranged in an energy guiding chain.

19. At least one chain link for an energy guiding chain to guide at least one of a cable or a line, the chain link comprising:

hinge elements configured to form a hinged connection with a further chain link of the energy guiding chain, two chain plates laterally spaced from each other, the chain plates each extending in a longitudinal direction of the chain link and each having a narrow side, at least one transverse bar connecting the chain plates together, wherein the at least one transverse bar forms at least one pivotable hinge connection with at least one chain plate of the chain plates, and the at least one transverse bar is positionable by pivotal movement into a closed position of connecting the chain plates together and into an open position at least partially opening an intermediate space between the chain plates, wherein the at least one transverse bar has at least one pivotable end region, the at least one pivotable end region latchingly fixable to the at least one chain plate of the at least one pivotable hinge connection, wherein the at least one pivotable hinge connection comprises a hinge pin and a hinge pin receiving means, wherein the hinge pin is provided by one of the at least one transverse bar and the at least one chain plate, and the hinge pin receiving means is provided by the other of the at least one transverse bar and the at least one chain plate, wherein the hinge pin has a length, the length having a cylindrical configuration having a radius (R1) and at least one recess, the at least one recess located at a side of the hinge pin that is remote from the narrow side of the at least one chain link, wherein the hinge pin receiving means has at least one latching nose which projects from a cylindrical region of the hinge pin receiving means, the cylindrical region of the hinge pin receiving means having the radius (R1), and the at least one latching nose engaging into the at least one recess of the hinge pin, wherein the at least one recess of the hinge pin is provided only over a portion of the length of the hinge pin at the side of the hinge pin that is remote from the narrow side of the at least one chain link, and the cylindrical configuration of the hinge pin cooperates with the cylindrical region of the hinge pin receiving means, and wherein the at least one latching nose engaging into the at least one recess is arranged at a side of the pin receiving means that faces towards an outside of the at least one chain plate.

20. At least one chain link for an energy guiding chain to guide at least one of a cable or a line, the chain link comprising:

hinge elements configured to form a hinged connection with a further chain link of the energy guiding chain, two chain plates laterally spaced from each other, the chain plates each extending in a longitudinal direction of the chain link and each having a narrow side, at least one transverse bar connecting the chain plates together, wherein the at least one transverse bar forms at least one pivotable hinge connection with at least one chain plate of the chain plates, and the at least one transverse bar is positionable by pivotal movement into a closed position of connecting the chain plates together and into an open position at least partially opening an intermediate space between the chain plates, wherein the at least one transverse bar has at least one pivotable end region, the at least one pivotable end region latchingly fixable to the at least one chain plate of the at least one pivotable hinge connection, wherein the at least one pivotable hinge connection comprises a hinge pin and a hinge pin receiving means, wherein the hinge pin is provided by one of the at least one transverse bar and the at least one chain plate, and the hinge pin receiving means is provided by the other of the at least one transverse bar and the at least one chain plate, wherein the hinge pin has a length, the length having a cylindrical configuration having a radius (R1) and at least one recess, the at least one recess located at a side of the hinge pin that is remote from the narrow side of the at least one chain link, wherein the hinge pin receiving means has at least one latching nose which projects from a cylindrical region of the hinge pin receiving means, the cylindrical region of the hinge pin receiving means having the radius (R1), and the at least one latching nose engaging into the at least one recess of the hinge pin, wherein the at least one recess of the hinge pin is provided only over a portion of the length of the hinge pin at the side of the hinge pin that is remote from the narrow side of the at least one chain link, and the cylindrical configuration of the hinge pin cooperates with the cylindrical region of the hinge pin receiving means, and wherein the at least one transverse bar connecting the chain plates together comprises two opposite transverse bars connecting the chain plates together, and only one of the two opposite transverse bars is hingedly held releasably to the chain plate at at least one or both end regions of the chain link, and the opposite transverse bar is formed integrally on the chain plates.

21. At least one chain link for an energy guiding chain to guide at least one of a cable or a line, the chain link comprising:

hinge elements configured to form a hinged connection with a further chain link of the energy guiding chain, two chain plates laterally spaced from each other, the chain plates each extending in a longitudinal direction of the chain link and each having a narrow side, at least one transverse bar connecting the chain plates together, wherein the at least one transverse bar forms at least one pivotable hinge connection with at least one chain plate of the chain plates, and the at least one transverse bar is positionable by pivotal movement into a closed position of connecting the chain plates together and into an open position at least partially opening an intermediate space between the chain plates, wherein the at least one transverse bar has at least one pivotable end region, the at least one pivotable end region latchingly fixable to the at least one chain plate of the at least one pivotable hinge connection, wherein the at least one pivotable hinge connection comprises a hinge pin and a hinge pin receiving means, wherein the hinge pin is provided by one of the at least one transverse bar and the at least one chain plate, and the hinge pin receiving means is provided by the other of the at least one transverse bar and the at least one chain plate, wherein the hinge pin has a length, the length having a cylindrical configuration having a radius (R1) and at least one recess, the at least one recess located at a side of the hinge pin that is remote from the narrow side of the at least one chain link, wherein the hinge pin receiving means has at least one latching nose which projects from a cylindrical region of the hinge pin receiving means, the cylindrical region of the hinge pin receiving means having the radius (R1), and the at least one latching nose engaging into the at least one recess of the hinge pin, wherein the at least one recess of the hinge pin is provided only over a portion of the length of the hinge pin at the side of the hinge pin that is remote from the narrow side of the at least one chain link, and the cylindrical configuration of the hinge pin cooperates with the cylindrical region of the hinge pin receiving means, and wherein in addition to the pivotable hinge connection provided by the hinge pin and the hinge pin receiving means, there is provided a latching means which latchingly cooperate between the transverse bar in its closed position and the at least one chain plate and the latching means limits a pivotal angle of the transverse bar in the open position.

* * * * *